(12) United States Patent
Ahmadzadeh et al.

(10) Patent No.: US 10,447,717 B2
(45) Date of Patent: Oct. 15, 2019

(54) NETWORK ATTACK DETECTION USING MULTI-PATH VERIFICATION

(71) Applicant: QUALCOMM Incorporated, San Diego, CA (US)

(72) Inventors: Seyed Ali Ahmadzadeh, San Jose, CA (US); Saumitra Mohan Das, Santa Clara, CA (US); Yin Chen, Campbell, CA (US); Sriram Nandha Premnath, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 15/418,693

(22) Filed: Jan. 28, 2017

(65) Prior Publication Data

US 2018/0219885 A1 Aug. 2, 2018

(51) Int. Cl.
*H04L 29/06* (2006.01)
*H04L 29/08* (2006.01)
*H04W 12/12* (2009.01)

(52) U.S. Cl.
CPC ...... *H04L 63/1425* (2013.01); *H04L 63/1408* (2013.01); *H04L 63/1441* (2013.01); *H04L 63/1483* (2013.01); *H04L 67/146* (2013.01); *H04W 12/12* (2013.01)

(58) Field of Classification Search
CPC ............. H04L 63/1425; H04L 63/1483; H04L 63/1408; H04L 67/146; H04L 63/1441; H04W 12/12
See application file for complete search history.

(56) References Cited

U.S. PATENT DOCUMENTS

| 8,655,312 B2 | 2/2014 | Stahlberg et al. |
| 8,683,609 B2 | 3/2014 | Bravo et al. |
| 9,628,993 B2* | 4/2017 | Liu ........................ H04W 12/12 |

(Continued)

FOREIGN PATENT DOCUMENTS

| KR | 20150028139 A | 3/2015 |
| WO | 2004097584 A2 | 11/2004 |

OTHER PUBLICATIONS

Dondyk E., "Denial of Convenience Attack to Smartphones Using a Fake Wi-Fi Access Point", The Burnett Honors College at the University of Central Florida, 2012, pp. 1-28.

(Continued)

*Primary Examiner* — Christopher C Harris
(74) *Attorney, Agent, or Firm* — The Marbury Law Group (57) ABSTRACT

Various embodiments provide methods, devices, and non-transitory processor-readable storage media enabling rogue access point detection with a communications device by sending multiple probes via different network connections to a remote server and receiving probe replies. Various embodiments may include a communication device transmitting a first probe addressed to a server via a first network connection and a second probe addressed to the server via a second network connection. Upon receiving a first probe reply from the server via the first network connection and a second probe reply from the server via the second network connection server, the communications device may analyze the received probe replies to determine whether an access point of either the first network or the second network is a rogue access point.

28 Claims, 5 Drawing Sheets

(56) References Cited

U.S. PATENT DOCUMENTS

| | | | |
|---|---|---|---|
| 2004/0023640 A1* | 2/2004 | Ballai | H04L 63/10 455/411 |
| 2007/0079376 A1* | 4/2007 | Robert | H04L 63/1408 726/23 |
| 2007/0218875 A1* | 9/2007 | Calhoun | H04L 63/126 455/411 |
| 2010/0172259 A1* | 7/2010 | Aggarwal | H04L 63/1466 370/252 |
| 2012/0023552 A1* | 1/2012 | Brown | H04L 63/14 726/3 |
| 2013/0019298 A1* | 1/2013 | Jover Segura | H04L 63/101 726/7 |
| 2013/0070744 A1* | 3/2013 | Baek | H04W 12/12 370/338 |
| 2013/0309971 A1 | 11/2013 | Kiukkonen et al. | |
| 2014/0334317 A1* | 11/2014 | Atreya | H04L 63/14 370/252 |
| 2015/0163734 A1* | 6/2015 | Park | H04W 12/12 370/338 |
| 2016/0149935 A1* | 5/2016 | Liu | H04W 12/12 726/7 |
| 2017/0346853 A1* | 11/2017 | Wyatt | H04L 43/12 |

OTHER PUBLICATIONS

Feng J.L., "Attack on WiFi-based Location Services and SSL Using Proxy Servers", University of Waterloo, Ontario, Canada, 2013, 97 Pages.

Malkin G., et al., "Traceroute Using an IP Option; rfc1393.txt", Network Working Group, RFC 1717, Internet Society (ISOC), Jan. 1, 1993, XP015007180, 7 pages.

Rosenberg J., et al., "Session Traversal Utilities for NAT (STUN); rfc5389.txt",Session Traversal Utilities for NAT (STUN); RFC5389. TXT, Internet Engineering Task Force, IETF, Standard, Internet Society (ISOC) 4, Rue Des Falaises CH-1205 Geneva, Switzerland, Oct. 1, 2008 (Oct. 1, 2008), XP015060362, 51 Pages.

International Search Report and Written Opinion—PCT/US2017/063591—ISA/EPO—dated Feb. 9, 2018.

\* cited by examiner

NETWORK ATTACK DETECTION USING MULTI-PATH VERIFICATION

BACKGROUND

The presence of subverted or "rogue" network side devices are a threat to data privacy. These rogue devices may masquerade as authorized access points, monitoring and routing received network traffic. Once a user connects to a rogue access point, the rogue device may execute a variety of attacks, such as man-in-the-middle attacks, domain name server (DNS) spoofing, traffic forwarding, and denial of service (DoS) attacks. Data packets received by a rogue device may be modified, re-routed to malicious third parties, or dropped entirely, thereby disrupting normal network traffic patterns and exposing data to unauthorized persons.

The ever-increasing number of access technologies enable user equipment to connect to access point results in a steadily increasing number of attack vectors presented by any given access point. The convergence of Wi-Fi and wireless wide area network (WWAN) further increases the volume and complexity of user connections. Other contributors to access point privacy exploits are peer-to-peer wireless, soft access points, and femto cells. These technologies enable dynamic network pathing accessible by a variety of access technologies, thereby increasing the difficulty experienced by individual user equipment in validating and verifying network routing integrity. Methods are needed for detecting rogue access points, particularly those exercising man-in-the-middle attacks, lying within a network access path.

SUMMARY

Various embodiments may include methods, devices for implementing the methods, and non-transitory processor-readable storage media storing processor-executable instructions for executing the methods for detecting compromised access points by a communications device. Various embodiments may include transmitting a first probe addressed to a server from the communications device via a first network connection with a first network, transmitting a second probe addressed to the server from the communications device via a second network connection with a second network, receiving a first probe reply from the server via the first network connection, receiving a second probe reply from the server via the second network connection server, and determining based, at least in part, on the first probe reply and the second probe reply whether an access point of either the first network or the second network is a rogue access point.

Some embodiments may include taking an action in response to determining that an access point of either the first network or the second network is a rogue access point. In such embodiments, taking an action may include terminating a network connection with one of an access point of the first network or of an access point of the second network determined to be a rogue access point.

In some embodiments, determining based, at least in part, on the first probe reply and the second probe reply, whether an access point of either the first network or the second network is a rogue access point may include analyzing the first probe reply and the second probe reply, determining based, at least in part, on a result of the analysis whether either the first probe reply or the second probe reply is malicious, and determining that an access point of either the first network or the second network is a rogue access point in response to determining that either the first probe reply or the second probe reply is malicious. In such embodiments, analyzing the first probe reply and the second probe reply may include comparing connection results and connection parameters of the first probe reply to connection results and connection parameters of the second probe reply. In such embodiments, the connection results may indicate whether a secure connection was established between the communications device and the server. In some embodiments, the connection parameters may include characteristics of a security certificate. In some embodiments, the connection parameters may include a security level of any redirect uniform resource locators (URLs). In some embodiments, the connection parameters may include characteristics of domain name system queries and results.

Further embodiments may include a computing device having a processor configured to perform operations of the methods summarized above. Further embodiments may include a computing device having means for performing functions of the methods summarized above. Further embodiments include a non-transitory processor-readable storage medium on which is stored processor-executable instructions configured to cause a processor of a computing device to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Various embodiments and implementations will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims.

The terms "communications device" and "computing device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor, memory, and circuitry for establishing wireless communications pathways and transmitting/receiving data via wireless communications pathways. The various aspects may be useful in communications devices, such as mobile communications devices (e.g., smart phones), and so such devices are referred to in the descriptions of various embodiments. However, the embodiments may be useful in any electronic devices capable of establishing two different network connections at the same time.

Communications devices, such as mobile communications devices (e.g., smart phones), may use a variety of interface technologies, such as wired interface technologies (e.g., Universal Serial Bus (USB) connections, etc.) and/or air interface technologies (also known as radio access technologies or "RATs") (e.g., Third Generation (3G), Fourth Generation (4G), Long Term Evolution (LTE), Edge, Bluetooth, Wi-Fi, satellite, etc.). Communications devices may establish connections to a network, such as the Internet, via more than one of these interface technologies at the same time (e.g., simultaneously). For example, a mobile communications device may establish an LTE network connection to the Internet via a cellular tower or a base station at the same time that the mobile communications device may establish a wireless local area network (WLAN) network connection (e.g., a Wi-Fi network connection) to an Internet connected Wi-Fi access point. The capability of communications devices to establish two different network connections at the same time may enable solutions for wired and wireless communications devices for detecting rogue access points.

Rogue access points are unauthorized network access points that may pose serious security risks. If installed by a malicious actor (attacker), the access point may provide access to network data flows, thereby enabling the attacker to execute a variety of network attacks that modify content sent to victims, forge digital certificates and public keys, DNS spoofing, password interception and recordation, and the like. Thus, the introduction of undetected rogue access points into a network traffic path can present serious privacy and other risks. The number of attack vectors continues to increase as communications device gain more connectivity options (e.g., softAP, femtocells, merged wireless wide-area network (WWAN) and WiFi).

Various embodiments provide methods, devices, and non-transitory processor-readable storage media enabling of detection of compromised access points by a communications device by leveraging dual network access technologies concurrently. Various embodiments may include transmitting a first probe addressed to a server from the communications device via a first network connection and a second probe addressed to the server from the communications device via a second network connection. The communications device may leverage the capability of connection to the same remote server via two different communications networks at the same time. For example, the communications device may attempt a first connection over WiFi, and a second connection over a cellular network connection. The communication device may receive a first probe reply from the server via the first network connection and a second probe reply from the server via the second network connection. The communications device may compare or otherwise analyze the received probe replies in order to determine base, at least in part, on the first probe reply and the second probe reply, whether an access point of either the first network or the second network is a rogue access point. The communications device may terminate one of the network connections to the server based, at least in part on determining that an access point of either the first network or the second network is a rogue access point.

In various embodiments, the communications device may analyze the first probe reply and the second probe reply to determine whether there is a rogue access point in one of the network paths. For example, each probe reply may include connection results and connection parameters. The communications device may compare the connection results and connection parameters of the first probe reply to connection results and connection parameters of the second probe reply. The communications device may determine based, at least in apart on a result of the analysis, whether either the first probe reply or the second probe reply is malicious. In various embodiments, if one or more of the probe replies is determined to be malicious then the communications device may determine that an access point of either the first network or the second network is a rogue access point.

The various embodiments enable a communications device to detect the presence of rogue access points, such as those operating man-in-the-middle (MitM) attacks, by transmitting messages using two different radio access technologies (RATs) and comparing the received responses. Detecting rogue access points, particularly those operating MitM attacks is difficult on devices utilizing only one network connection. Third parties may be required to provide validation or authentication of certificates and connection credentials. However, communicating with a third party during every transaction with a remote server may eat into the bandwidth and processing resources of a communications device. By leveraging the dual network connection capabilities of communications devices, the various embodiments may enable access point verification by the communications device itself. Because the communications device does not require the assistance of a server or third party to verify an access point, the communications device does not need to expend resources verifying the trust level of remote servers. Thus, various embodiments enable faster, more efficient but secure connections between the communications device and a remote server.

The communications device may send multiple probes (i.e., queries) to a remote server using a different radio access technology (RAT) for each probe. In an example, the communications device (e.g., smartphone, laptop, tablet, etc.) may send a first probe to the remote server using a WiFi connection to a local network connected to the Internet. Simultaneously, the communications device may send a probe to the remote server using a cellular telephone data connection. Each of the probes travels along a different network access path on the way to the remote server. If any of the access points along a network access path are rogue access points, particularly those operating MitM attacks, the access point will modify the probe, replacing identifying information with its own information. Thus, when received by the remote server, a probe from a normal access point will be different than one that has passed through a rogue access point.

The computing device receives one probe reply to each probe it transmitted to the server. Any probe replies passing through rogue access points are likely to be modified. As such, the probe replies received by the communications device will be different if one has been modified by a rogue access point. If no rogue access points are encountered by any probe reply, or if any rogue access point is not currently executing an attack, then the received probe replies may be the same. Thus, the computing device compares the two received responses to determine whether there is a rogue access point or man-in-the-middle attack.

In various embodiments, the communications device may compare the two probe replies to determine if a rogue access point lies along either of the travelled network paths. The communications device may create for each of the probe replies, a behavior vector that includes key features of each probe reply. Not every aspect of a probe reply will be affected by a rogue access point. For example, basic visual elements of a response webpage may be unaffected. Creating a vector of selected portions/features of each probe reply that are most likely to be changed by a rogue access point, may enable a faster, more efficient comparison to be made.

In various embodiments, the communications device may detect a rogue access point by applying the created behavior vectors to a classifier model. A classifier model is an algorithm or array of decision criteria configured to process a vector of behavior data (e.g., a behavior vector) in order to determine whether the behavior data indicates that the access point is exhibiting benign or non-benign behaviors. A classifier model may be generated by training the model using machine learning methods to recognize benign and/or non-benign behaviors by having the model process behavior vectors that are known to be associated with benign or non-benign behaviors and adjusting model parameters so that the correct conclusion is reached.

This application of a classifier model may generate an output indicating whether a rogue access point is present in one of the travelled network access paths. The communications device may select a classifier model for each probe reply. For example, the communications device may select a type of classifier model specific to WiFi probe when one of the RATs used to contact the server is WiFi. The communications device then applies the selected classifier model to the behavior vectors and based, at least in part on the result of the comparison, determines whether the probe replies indicate a non-benign response. Non-benign responses indicate the modification of the probe reply/replies by a rogue access point, such as those operating a man-in-the-middle attack.

Various embodiments may include communications devices having a probe manager running on a processor of a communications device, such as on the application processor of communications device, on a dedicated processor of the communications device, on a modem processor of the communications device, or on any one or more processors of the communications device. The probe manager may send and receive probes and probe replies to/from a network as summarized above and described in more detail below.

The probe manager may receive and record a probe reply sent by the Session Traversal Utilities for Network Address Translation (STUN) server to the communications device. The probe reply may include status or result of an attempted connection with the server along with multiple connection parameters. The connection parameters may include the uniform resource locator (URL) to which the probe is redirected, domain name system (DNS) queries/replies, and/or connection certificate characteristics. The connection results and connection parameters may be features in a behavior vector associated with each probe reply.

Various embodiments may enable the probe manager to detect rogue access points or man-in-the-middle attacks by analyzing probe replies from probes transmitted to a server by a communications device using at least two different communication technologies or networks. Various embodiments may enable the probe manager to transmit probes to a remote server using different communication technologies, and comparing the received responses to determine whether the responses are different, detecting that a rouge access point exits or a man-in-the-middle attack is underway what the responses are different. Various embodiments may enable the probe manager to analyze probe replies from the server by converting the received probe replies into a vector of selected features, in which the features are those elements of a server response most likely to be changed in a man-in-the-middle attack, and performing analysis on the vector, such as comparing two vectors of responses received from probes sent via two different communication technologies. Various embodiments may enable the probe manager to probe a remote server via two different communications technologies, receiving probe replies from the server, and comparing the probe replies to a behavior model.

Figure 1:
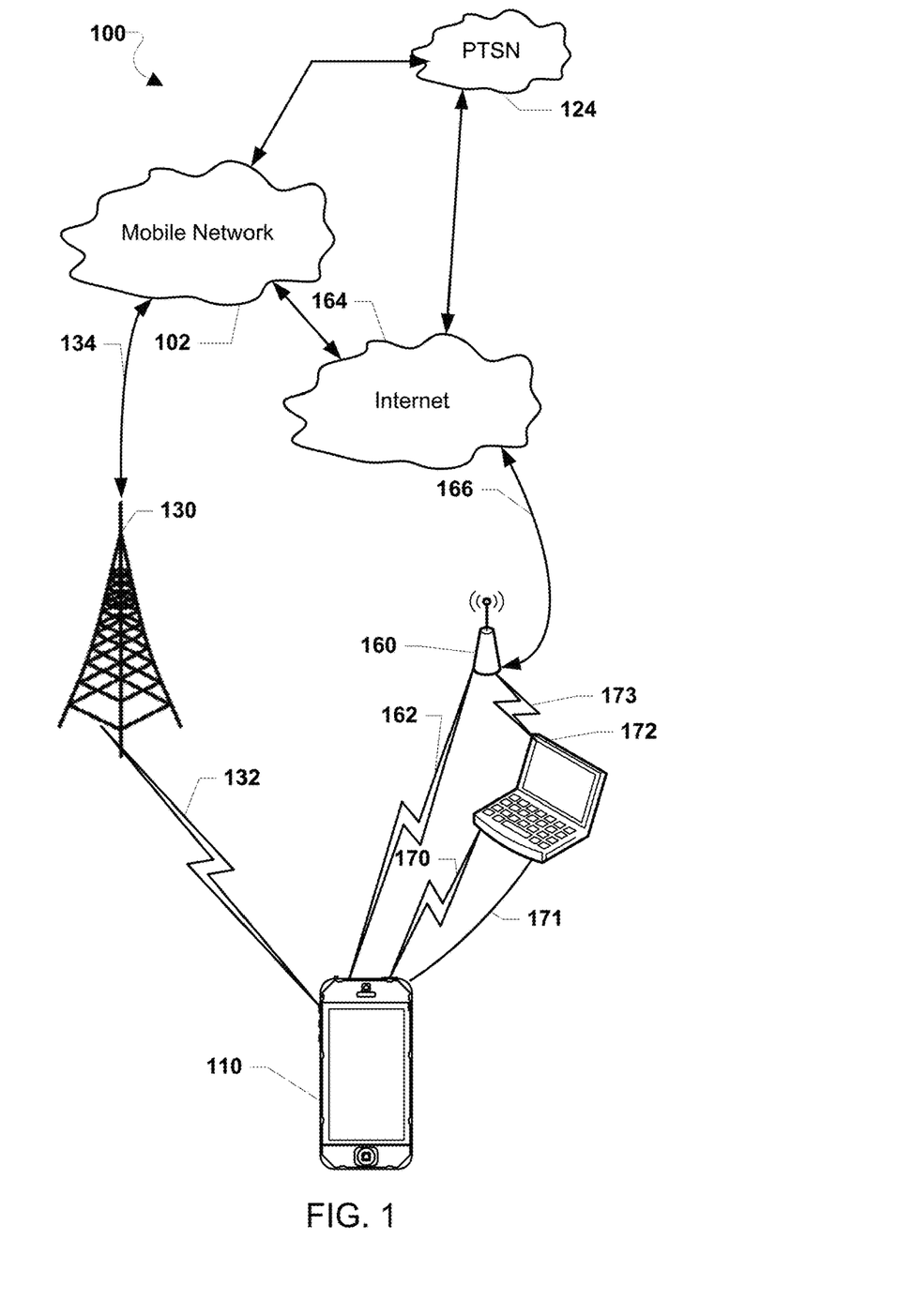
FIG. 1 is a communications system block diagram of a network suitable for use with the various embodiments.

Various embodiments may be implemented within a variety of communications systems 100, an example of which is illustrated in FIG. 1. A mobile network 102 typically includes a plurality of cellular base stations (e.g., a first base station 130. The network 102 may also be referred to by those of skill in the art as access networks, radio access networks, base station subsystems (BSSs), Universal Mobile Telecommunications Systems (UMTS) Terrestrial Radio Access Networks (UTRANs), etc. The network 102 may use the same or different wireless interface technologies and/or physical layers. In an embodiment, the base stations 130 may be controlled by one or more base station controllers (BSCs). Alternate network configurations may also be used and the embodiments are not limited to the configuration illustrated.

A first communications device 110 may be in communications with the mobile network 102 through a cellular connection 132 to the first base station 130. The first base station 130 may be in communications with the mobile network 102 over a wired connection 134.

The cellular connection 132 may be made through two-way wireless communications links, such as Global System for Mobile Communications (GSM), UMTS (e.g., Long Term Evolution (LTE)), Frequency Division Multiple Access (FDMA), Time Division Multiple Access (TDMA), Code Division Multiple Access (CDMA) (e.g., CDMA 1100 1x), WCDMA, Personal Communications (PCS), Third Generation (3G), Fourth Generation (4G), Fifth Generation (5G), or other mobile communications technologies. In various embodiments, the communications device 110 may access network 102 after camping on cells managed by the base station 130.

The network 102 may be interconnected by public switched telephone network (PSTN) 124 and/or the Internet 164, across which the network 102 may route various incoming and outgoing communications to/from the communications device 110.

In some embodiments, the first communications device 110 may establish a wireless connection 162 with a wireless access point 160, such as over a WLAN connection (e.g., a Wi-Fi connection). In some embodiments, the first communications device 110 may establish a wireless connection 170 (e.g., a personal area network connection, such as a Bluetooth connection) and/or wired connection 171 (e.g., a USB connection) with a second communications device 172. The second communications device 172 may be configured to establish a wireless connection 173 with the wireless access point 160, such as over a WLAN connection (e.g., a Wi-Fi connection). The wireless access point 160 may be configured to connect to the Internet 164 or another network over the wired connection 166, such as via one or more modem and router. Incoming and outgoing communications may be routed across the Internet 164 to/from the communications device 110 via the connections 162, 170, and/or 171. In some embodiments, the access point 160 may be configured to run network address translation (NAT) services mapping local network addresses of the first communications device 110 and the second communications device 172 to a public Internet protocol (IP) address and port prior to routing respective data flows to Internet 164.

Figure 2:
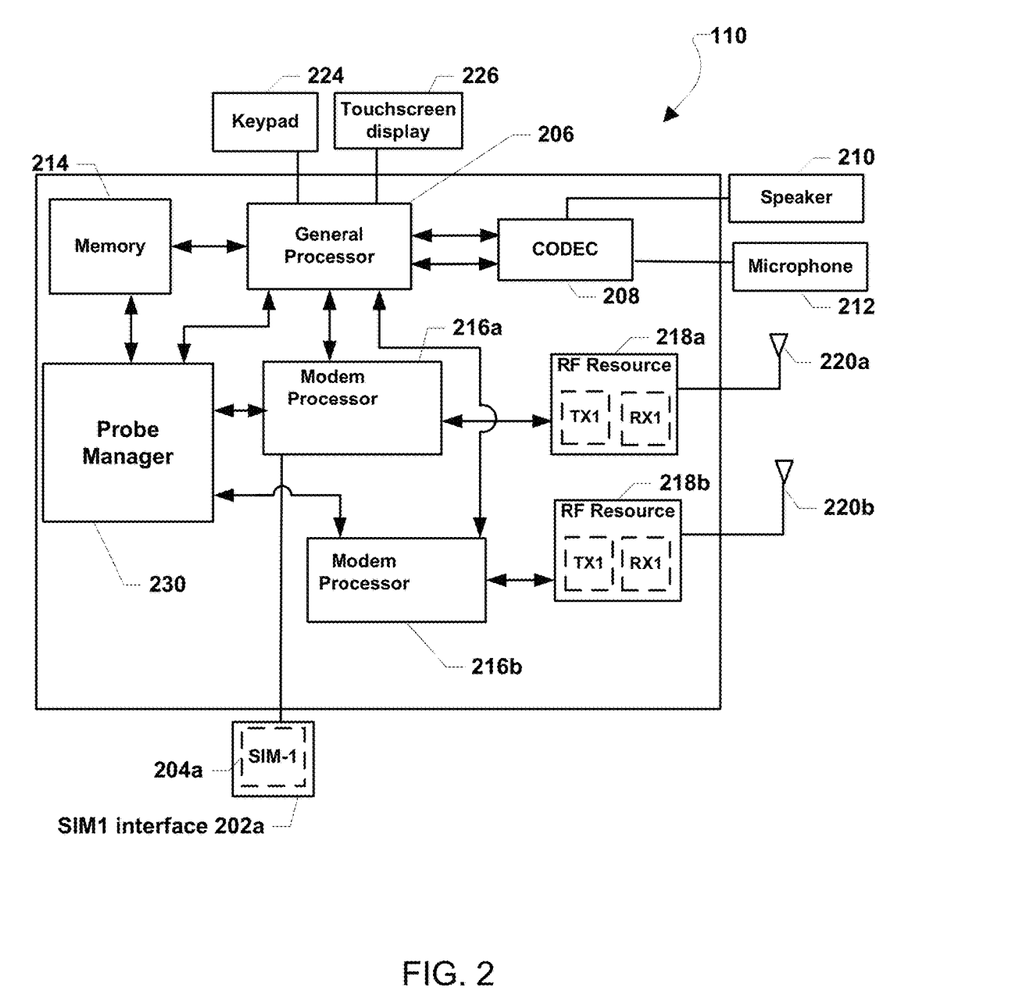
FIG. 2 is a block diagram illustrating a communications device according to various embodiments.

FIG. 2 is a functional block diagram of an example communications device 110 that is suitable for implementing various embodiments. With reference to FIGS. 1-2, the communications device 110 may include a first subscriber identity module (SIM) interface 202a, which may receive a first identity module SIM 204a that is associated with a first subscription.

A SIM, in various embodiments, may be a Universal Integrated Circuit Card (UICC) that is configured with SIM and/or Universal SIM (USIM) applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the communications device 110 (e.g., memory 214), and thus need not be a separate or removable circuit, chip or card.

The communications device 110 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communications data though a corresponding radio frequency (RF) resource chain.

The memory 214 may store an operating system (OS), as well as user application software and executable instructions. The memory 214 may also store application data, such as an array data structure.

The general processor 206 and the memory 214 may each be coupled to at least two modem processors 216a and 216b. A first RF resource chain may include the first modem processor 216a, which may perform baseband/modem functions for communicating with/controlling an interface technology, and may include one or more amplifiers and radios, referred to generally herein as RF resources (e.g., RF resources 218a). The SIM 204a in the communications device 110 may use the first RF resource chain. The RF resource 218a may be coupled to antenna 220a and may perform transmit/receive functions for the wireless services, such as services associated with SIM 204a, of the communications device 110. The RF resource 218a may provide separate transmit and receive functionality, or may include a transceiver that combines transmitter and receiver functions. A second RF resource chain may include the second modem processor 216b, which may perform baseband/modem functions for communicating with/controlling an interface technology, and may include one or more amplifiers and radios, referred to generally herein as RF resources (e.g., RF resources 218b). The RF resource 218b may be coupled to antenna 220b and may perform transmit/receive functions for the wireless services of the communications device 110. The RF resource 218b may provide separate transmit and receive functionality, or may include a transceiver that combines transmitter and receiver functions.

In various embodiments, the first RF resource chain including the first modem processor 216a and the second RF resource chain including the second modem processor 216b may be associated with different interface technologies. For example, one RF resource chain may be associated with a cellular air interface technology and the other RF resource chain may be associated with a WLAN technology. As another example, one RF resource chain may be associated with a cellular air interface technology and the other RF resource chain may be associated with a personal area network (PAN) technology. As another example, one RF resource chain may be associated with a PAN technology and the other RF resource chain may be associated with a WLAN technology. As another example, one RF resource chain may be associated with a cellular air interface technology and the other RF resource chain may be associated with a satellite interface technology. As another example, one RF resource chain may be associated with a WLAN technology and the other RF resource chain may be associated with a satellite air interface technology. Other combinations of different interface technologies, including wired and wireless combinations, may be substituted in the various embodiments, and cellular air interface technologies, WLAN technologies, satellite interface technologies, and PAN technologies are merely used as examples to illustrate aspects of the various embodiments.

In some embodiments, the general processor 206, the memory 214, the modem processors 216a, 216b, and the RF resources 218a, 218b may be included in the communications device 110 as a system-on-chip. In some embodiments, the SIM 204a and the corresponding interface 202a may be external to the system-on-chip. Further, various input and output devices may be coupled to components on the system-on-chip, such as interfaces or controllers. Example user input components suitable for use in the communications device 110 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. As another example, the request to initiate the outgoing call may be in the form of a voice command received via the microphone 212. Interfaces may be provided between the various software modules and functions in the communications device 110 to enable communications between them. Inputs to the keypad 224, touchscreen display 226, and the microphone 212 discussed above are merely provided as examples of types of inputs that may initiate an outgoing call and/or initiate other actions on the communications device 110. Any other type of input or combinations of inputs may be used in various embodiments to initiate an outgoing call and/or initiate other actions on the communications device 110.

The communications device 110 may include a probe manager 230 configured to manage network probing. The probe manager 230 may be configured to send probes via the different interface technologies of the communications device 110. The probe manager 230 may further be configured to receive probe replies via the different interface technologies of the communications device 110.

In some embodiments, the probe manager 230 may be implemented within the general processor 206. In some embodiments, the probe manager 230 may be implemented as a separate hardware component (i.e., separate from the general processor 206). In some embodiments, the probe manager 230 may be implemented as a software application stored within the memory 214 and executed by the general processor 206. In various embodiments, the probe manager 230—modem processors 216a, 216b, RF resources 218a, 218b, and/or SIM 204a may be implemented in hardware, software, firmware, or any combination thereof.

While two RF resource chains including the first modem processor 216a and the second modem processor 216b are illustrated in FIG. 2, additional RF resource chains and additional modem processors may be included in the communications device 110, thereby enabling additional network connections to be made at the same time. Additionally, wired connections may be established via modem processors connected to input/output ports of the communications device 110.

Figure 3:
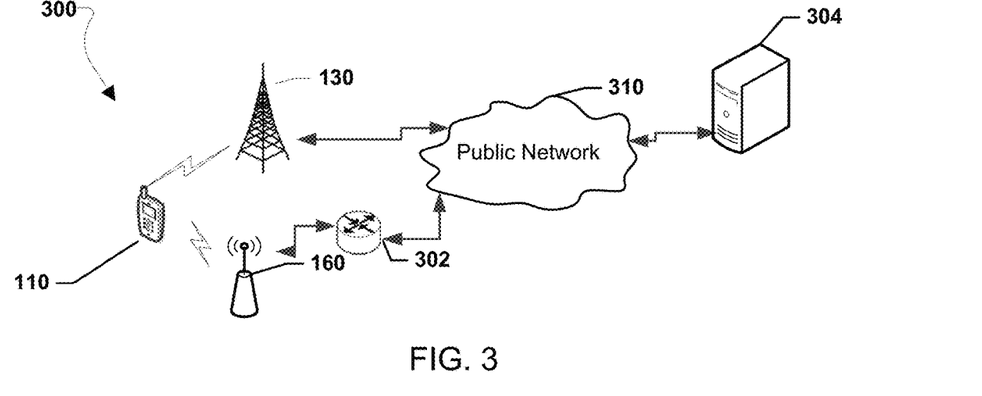
FIG. 3 is a block diagram illustrating interactions between a communications device and a network for detecting compromised access points according to various embodiments.

FIG. 3 is a network diagram illustrating interactions between a communications device (e.g., the communications device 110 described with reference to FIGS. 1-3) and a network 300 for network probing according to various embodiments. One or more communications devices 110 may establish a network connection of a WLAN interface technology with one or more access points such as a wireless access point 160 and a router 302. One or more communications devices 110, may establish a network connection of a cellular interface technology such as by base station 130. The network 300 represents a configuration in which no rogue access points are present, and is suitable for implementing the various embodiments.

A communications device 110 may generate a probe addressed to the Remote server 304 connected to the access point 160 by router 302 and a public network 310. The wireless access point 160 may receive the probe, determine the destination IP and destination port and pass it along the network path toward the remote server 304. In some embodiments, a network traffic path may contain multiple legitimate wireless access devices such as wireless access point 160 and router 302. Simultaneously, the communications device 110 may generate and transmit a probe to the remove server 304 via a cellular network connection, such as by base station 130.

The probe addressed to the remote server 304 may be routed over the public network 310 (e.g., the Internet 164) from the wireless access point 160 or the router 302 or base station 130 to the remote server 304. Similarly, the remote server 304 may transmit a probe reply over the public network 310 to both the base station 130, and either the router 302 or the wireless access point 160, whichever access point is next in the network traffic path (i.e., closest to the remote server in the network path). Each probe may travel a different network access path because it is being transmitted across the networks of different service providers, via different network communication technologies. In various embodiments, each probe reply may return along the same network access path as that in which the initiating probe reached the remote server 304.

Figure 4:
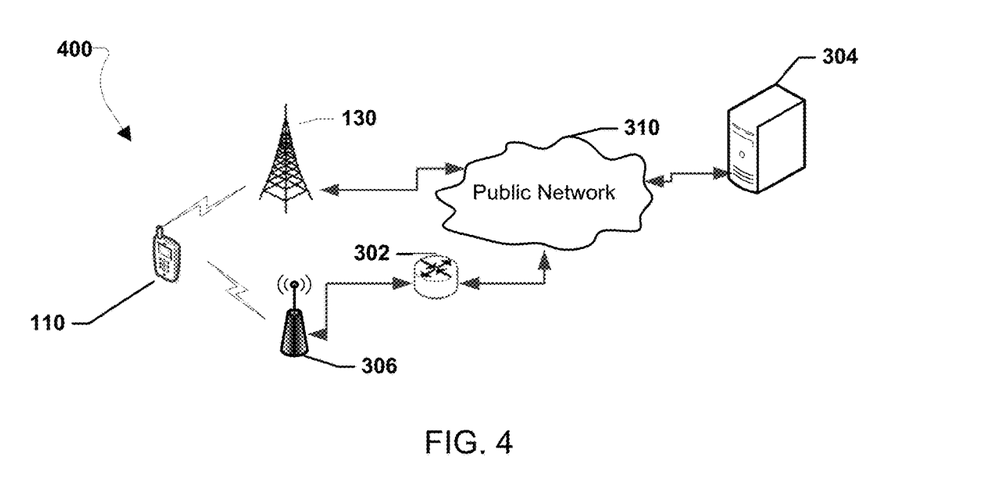
FIG. 4 is a block diagram illustrating interactions between a communications device and a network for detecting compromised access points according to various embodiments.

FIG. 4 is a network diagram illustrating interactions between a communications device (e.g., the communications device 110 described with reference to FIGS. 1-4) and a network 400 for network probing according to various embodiments. One or more communications devices 110 may establish a network connection of a WLAN interface technology with one or more access points such as the wireless access point 160, rogue access point 306, and router 302. One or more communications devices 110 may also connect to a remote server via a cellular network interface via base station 130. The network 400 represents a configuration in which a rogue access point is present in the network traffic path, and is suitable for implementing the various embodiments.

As described with reference to FIG. 3, the communications device 110 may generate multiple probes addressed to the remote server 304. In the example illustrated in FIG. 4, the communications device 110 is connected to and associated with a rogue access point 306. Because the rogue access point 306 does not have authorized access to the data flow backhaul and security information of the communications device 110 and the remote server 304, the rogue access point may alter a received probe from the communications device and insert its own identifying information. Thus, probes transmitted by the communications device may reach the remote server with altered identifying information.

The communications device may also be connected to and associated with a cellular network interface via base station 130. At the same time that the communications device transmits the first probe to the rogue access point 306, the communications device 110 may also transmit a second probe to the first base station 130. Thus, the communications device may transmit the same probe to the remote server 304, via two different network access technologies.

Referring to FIG. 3, the wireless access point 160 may receive the probe either directly from communications device 110 or as a public flow from the rogue access point 306. A probe arriving from the communications device 110 may have a packet header containing a 5-tuple including the source IP and source port of the communications device 110. However, because the packet headers of the probe originating from communications device 110 is modified as the packets traverse the rogue access point 306, the source IP and source port of the probe received at the wireless access point 160 will reflect the IP and port associated with the rogue access point 306.

In various embodiments, a communications device 110 may establish a connection with two separate networks using different access technologies. Using the multiple interfaces the communications device may transmit a probe via each network interface to the remote server 304. Each probe may be a request such as a hypertext transfer protocol (HTTP) request issued over a WiFi or cellular data network. The remote server 304 may treat each request independently and may redirect each request to a secure website.

In various embodiments, the remote server 304 may transmit a probe reply to each of the transmitted probes. Each probe reply may contain information such as whether or not a connection was successfully established, a hypertext transfer protocol secure (HTTPS) redirect status, the URL of any website to which the probe was redirected; security certificate characteristics, DNS queries/replies, etc. Redirect URLs may be different between probe replies for different network access technologies. However, in a normal, non-MitM modified situation, both requests may be redirected to a secure server even though each is redirected to a different secure server.

In various embodiments, received probe replies may be compared to detect rogue access point attack indications (e.g., MitM attack indications), such as HTTPs redirect on cellular-based probes and unencrypted HTTP responses on WiFi-based probes. The probe replies of from two or more interfaces are compared to generate feature vectors. The feature vector may be a vector, matrix, or other data structure containing elements representing the characteristics of the probe reply. A mismatch between probe replies may indicate the presence of a rogue access point. If a mismatch is detected the probe manager 230 may submit a feature vector representing the comparison of the two probe replies to the processor. The processor may compare the feature vector to a classifier model representing a model probe reply to determine if the mismatch differs from the classifier model. In this manner, the processor may detect MitM attacks, malicious code injected over rogue connections, sensitive information (e.g., password) exchanged in plaintext over SSL-stripped connection, etc.

The processor may analyze components of the probe reply such as response size; Java Script blocks, Iframes/HTTP forms; persistent/session dependent cookies, HTTP/HTTPS cookies; received response digest (e.g., hash digest over time-invariant content of the response, different request/response elements can be used in detection process). These features may be compared to the same responses for probe reply response pairs that are determined to be normal. The communications device 110 may store examples of normal probe reply pairs locally and/or request them from a trusted remote source as needed.

In various embodiments, the communications device 110 may utilize machine learning or other form of analysis to determine whether the probe replies represent malicious behavior and thus indicate the presence of a rogue access point. Because malicious actors may attempt to subvert basic security measures with MitM attacks, the mere result of a match in connection URL or IP address between probe replies may be insufficient to verify that a rogue access point is not present. Thus, the matching of connection status, while a useful indicator, is insufficient to guarantee the veracity of each network access paths. To provide a more granular and accurate detection of malicious behavior, the communications device 110 includes connection parameters in the feature vector for analysis.

Connection parameters may include enabled security protocols (e.g., whether Secure Sockets Layer (SSL) is enabled on one or more of the network interfaces). The connection parameters may also include supported security schemes, encryption/authentication modes and configurations (e.g., mutual authentication is enabled on one or more network interfaces). The communication parameters may include certification characteristics for access points along the network access path. Certification characteristics may include such as certificate class and certifying authority (e.g., Class 3 vs. Self signed), any supported security protocols (e.g., supported cryptographic algorithms, key size), and certificate expiration (e.g., expired certificate on one path). The communication parameters may further include redirection URL information. This may include information regarding redirection to a URL with lower security levels (e.g., Redirect to SSL enables page on one or more interfaces). The communication parameters may also include DNS query/response information. Such information may include returned (URL, IP) pair in response to a DNS query, discrepancies in resolved IP for the same domain name (e.g., servers are located on different geo locations, DNS resolutions for arbitrary URLs on one interface). One or more of these connection parameters may be represented as an element in a feature vector.

In some embodiments, the feature vector may be the output of a comparison between the first probe reply and the second probe reply. For example, the feature vector may contain elements indicating those features for which there is a discrepancy between the probe replies. In such an example, the elements of the feature vector that correspond to parameters for which there was a match between probe replies may be equal to 1 or 0 to indicate a match. In some embodiments, the elements may be values indicating a degree of discrepancy between the corresponding element of the behavior vector and classifier model. The resulting feature vector may be compared to a classifier model in order to determine whether the number and nature of discrepancies is indicative of malicious behavior, and thus a rogue access point.

In some embodiments, each probe reply may have its own feature vector, in which each element represents that communication connection and communication parameters of the probe reply. Each feature vector may be compared to the classifier model to detect suspicious features that might indicate malicious behavior. These results may then be compared to determine if any match between suspicious features exists.

Various embodiments enable dynamic, on the fly, comparison of the probe replies received from a remote server via different network interfaces. The various embodiments do not require preloaded or dynamic server profiles on the communications device 110. As such, the various embodiments may be implemented with any website the communications device 110 access, even if the visit is a first visit.

It is difficult for an adversary to simultaneously control two radio access technologies. For example, WiFi rogue access point attackers are unlikely to control the cellular network at the same time as they exert control over the WiFI access point. Thus, the various embodiments may enable communications devices to dynamically detect rogue access points by utilizing multiple network access technologies to connection to a remote server and analyzing the results of both connection attempts. In so doing, the various embodiments may improve the security of the communications devices by enabling it to detect rogue access points and thus avoid accessing a remote server via an associated network interface. The various embodiments may further improve the performance of the communications device may eliminating the need for regular communications with third party or cloud services, which consumes available bandwidth and battery resources.

Figure 5:
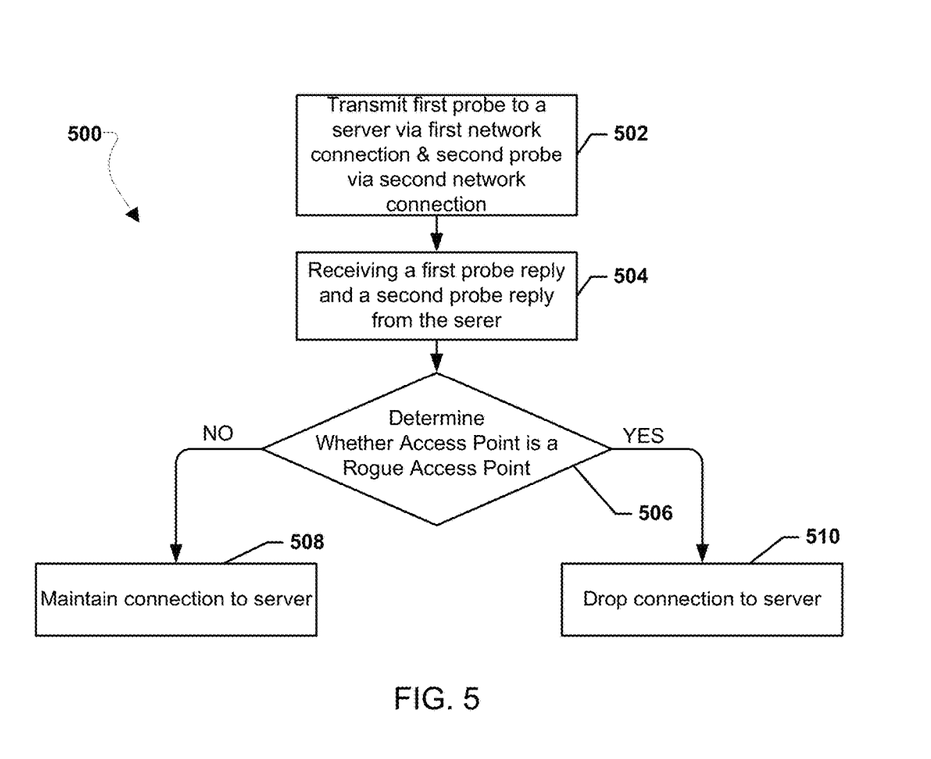
FIG. 5 is a process flow diagram illustrating a method for detecting compromised access points with a communications device according to various embodiments.

FIG. 5 illustrates a method 500 for detecting rogue access points according to various embodiments. With reference to FIGS. 1-5, the method 500 may be implemented with a processor (e.g., the general processor 206, the modem processors 216a, 216b, a separate controller, and/or the like) of a communications device (e.g., the communications device 110 described with reference to FIGS. 1-2). For example, the method 500 may be implemented by a probe manager (e.g., the probe manager 230) running on a processor (e.g., the general processor 206, the modem processors 216a, 216b, a separate controller, and/or the like) of a communications device (e.g., the communications device 110 described with reference to FIGS. 1-2).

In block 502, the probe manager may transmit a first probe addressed to a server via a first network connection and a second probe addressed to the server via a second network connection. The probe manager may generate a probe such as an HTTP request, and may transmit the same probe (or a functionally equivalent probe) to the same remote server (i.e., remote server 304), via each of the network connections. For example, the first probe may be transmitted over an Ethernet or WiFi network interface, while the second probe is transmitted via cellular data network interface.

In block 504, the probe manager may receive a first probe reply from the server via the first network connection and a second probe reply from the server via the second network connection server. The remote server 304 may receive the first and second probes and may establish a secure connection with the communication device via one or both network interfaces. In some embodiments, the URL or associated IP of the remote server may not be secure, and the probe may be redirected to a secure server for connection. The remote server 304 may then transmit a probe reply in response to each probe. The first probe reply may travel back along the first network connection, travelling the same network access path to reach the communications device. Similarly, the second probe reply may travel along the network access path of the second network connection to reach the communications device. As the probe replies travel, their packet headers may be modified by hops along the network access path. The probe replies received by the communications device may contain the connection status and connection parameters associated with the success of the connection attempt and the identifying and security information of hops along the network access path.

In determination block 506, the probe manager may determine based, at least in part on the first probe reply and the second probe reply, whether an access point of either the first network or the second network is a rogue access point. The probe manager or the processor of the communications device may analyze the first probe reply and the second probe reply to determine whether either of the replies represents malicious behavior and as such a rogue access point is present along a network access path.

In response to determining that no access point of either the first network or the second network is a rogue access point (i.e., determination block 506="No"), the probe manager may maintain the connection to the server via one or more of the network connections in block 508. Thus, if no malicious behavior is detected, the communications device 110 may continue operations as usually and may communicate with the remote server 304 along one or both of the network interfaces.

In response to determining that an access point of either the first network or the second network is a rogue access point (i.e., determination block 506="Yes"), the probe manager may terminate a network connection the server in block 510. If the probe manager or processor of the communications device, 110 determines that there is a rogue access point (e.g., a MitM attack) in the network access path, the communications device may take an action to protect the communication device. For example, the communication device may terminate the connection with the remote server via one or both network interfaces. As another example, the communications device may maintain a connection with the remote server 304 via the cellular network (i.e., second network connection) but may drop the WiFi network interface connection in response to determining that the WiFi network access point is a rogue access point. Optionally, the communications device may report the detection of a rogue access point to an administrator.

Figure 6:
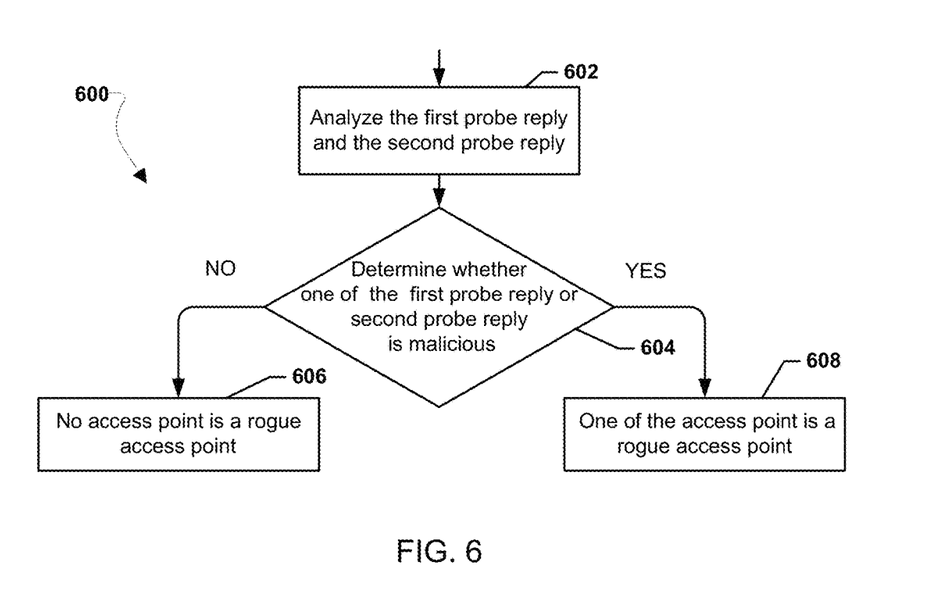
FIG. 6 is a process flow diagram illustrating a method for probe reply analysis with a communications device according to various embodiments.

FIG. 6 illustrates a method 600 for determining whether an access point is a rogue access point according to various embodiments and as illustrated in block 506, FIG. 5. With reference to FIGS. 1-6, the method 600 may be implemented with a processor (e.g., the general processor 206, the modem processors 216a, 216b, a separate controller, and/or the like) of a communications device (e.g., the communications device 110 described with reference to FIGS. 1-2). For example, the method 600 may be implemented by a probe manager (e.g., the probe manager 230) running on a processor (e.g., the general processor 206, the modem processors 216a, 216b, a separate controller, and/or the like) of a communications device (e.g., the communications device 110 described with reference to FIGS. 1-2).

In block 602, the probe manager may analyze the first probe reply and the second probe reply. For example, the probe manager or processor of the communications device, may compare the connection status and connection parameters of each probe reply to each other. The results of the comparison, such as the mismatches/discrepancies, may be placed in a feature vector. The feature vector may be a matrix or vector of elements representing probe reply features. The feature vector generated may represent the features upon which the two probe replies did not match.

In determination block 604, the probe manager may determine based, at least in part on a result of the analysis, whether either the first probe reply or the second probe reply is malicious. The probe manager or processor may compare the feature vector against a classifier model, such as another vector including elements representing expected probe reply behavior. The probe manager may analyze the scope, nature, and number, of discrepancies between the classifier model and the feature vector to determine whether the result of comparing the two probe replies indicates that malicious behavior is occurring.

In response to determining that neither the first probe reply or the second probe reply is malicious (i.e., determination block 604="No"), the probe manager may determine that there is no access point lying along either travelled network path that is a rogue access point in block 606. In response to determining that there is no rogue access point along either travelled network path, the communication device may continue to communicate via either network.

In response to determining that an access point of either the first network or the second network is a rogue access point (i.e., determination block 604="Yes"), the probe manager may determine that an access point of either the first network or the second network is a rogue access point in block 608. The indication that probe replies represent malicious activity may be an indication that a rogue access point is present along a network access path. Thus, in response to determining that there is a rogue access point along either travelled network path, the communication device may terminate of a connection with the remote server via the network including a rogue access point.

Figure 7:
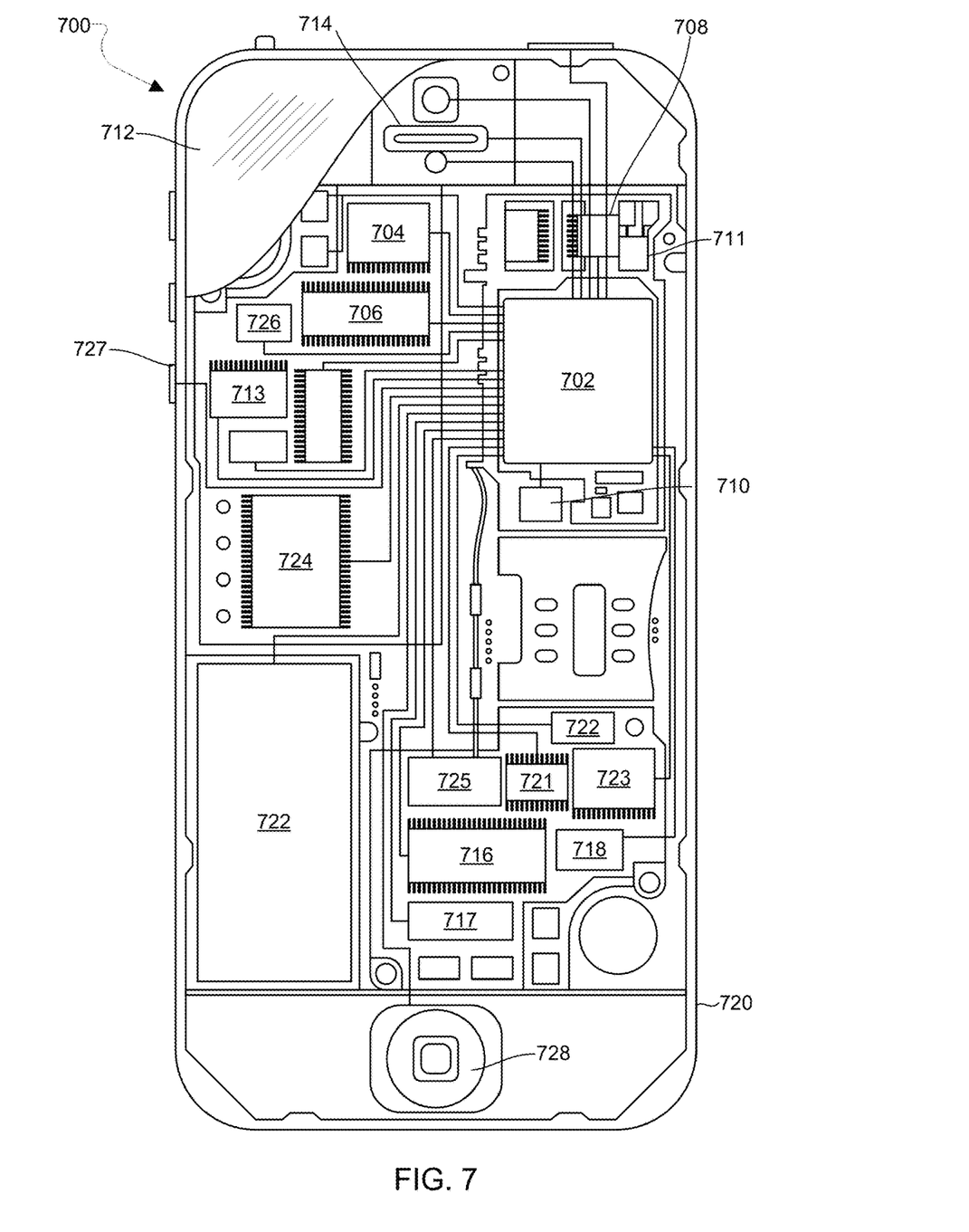
FIG. 7 is a component block diagram of a communications device suitable for implementing some embodiments.

Various embodiments may be implemented in any of a variety of communications devices, an example on which (e.g., communications device 700) is illustrated in FIG. 7. With reference to FIGS. 1-7, the communications device 700 may be similar to the communications device 110 and may implement the method 500 and/or the method 600 as described.

The communications device 700 may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the communications device 700 need not have touch screen capability.

The communications device 700 may have one or more cellular network transceivers 708 coupled to the processor 702 and to one or more antennae 710 and configured for sending and receiving cellular communications. The transceiver 708 and the antenna 710 may be used with the circuitry mentioned herein to implement the methods of various embodiments. The communications device 700 may include one or more SIM cards (e.g., SIM 713) coupled to the transceiver 708 and/or the processor 702 and configured as described. The communications device 700 may include a cellular network wireless modem chip 717 coupled to the processor 702 that enables communications via a cellular network.

The communications device 700 may have one or more WLAN transceivers 716 (e.g., one or more Wi-Fi transceivers) coupled to the processor 702 and to one or more antennae 711 and configured for sending and receiving WLAN communications. The transceiver 716 and the antenna 711 may be used with the circuitry mentioned herein to implement the methods of various embodiments. The communications device 700 may include a WLAN wireless modem chip 718 coupled to the processor 702 that enables communications via a WLAN.

The communications device 700 may have one or more Bluetooth transceivers 721 coupled to the processor 702 and configured for sending and receiving Bluetooth communications. The Bluetooth transceiver 721 may be used with the circuitry mentioned herein to implement the methods of various embodiments. The communications device 700 may include a Bluetooth wireless modem chip 723 coupled to the processor 702 that enables communications via Bluetooth.

The communications device 700 may have one or more satellite transceivers 724 coupled to the processor 702 and to one or more antennae 725 and configured for sending and receiving Bluetooth communications. The transceiver 724 and the antenna 725 may be used with the circuitry mentioned herein to implement the methods of various embodiments. The communications device 700 may include a satellite wireless modem chip 726 coupled to the processor 702 that enables communications via satellite networks.

The communications device 700 may also include speakers 714 for providing audio outputs. The communications device 700 may also include a housing 720, constructed of a plastic, metal, or a combination of materials, for containing all or some of the components discussed herein. The communications device 700 may include a power source 722 coupled to the processor 702, such as a disposable or rechargeable battery. The rechargeable battery may also be coupled to the peripheral device connection port to receive a charging current from a source external to the communications device 700. The peripheral device connection port, such as a USB port, may be connected to the processor 702, and may be configured to established wired network connections via wired interface technologies and may be used with the circuitry mentioned herein to implement the methods of the various embodiments. The communications device 700 may also include a physical button 728 for receiving user inputs. The communications device 700 may also include a power button 727 for turning the communications device 700 on and off.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the embodiments disclosed herein may be implemented or performed with a variety of processors. Examples of suitable processors include, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electronically erasable/programmable read-only memory (EEPROM), FLASH memory, compact disc read-only memory (CD-ROM) or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the various embodiments. Various modifications to these embodiments will be readily apparent to those skilled in the art, and the generic principles defined herein may be applied to some embodiments without departing from the scope of the claims. Thus, the present disclosure is not intended to be limited to the examples shown herein but is to be accorded the widest scope consistent with the following claims and the principles and novel features disclosed herein.

What is claimed is:

1. A method of detecting compromised access points by a communications device, comprising:
    transmitting a first probe addressed to a server from the communications device via a first radio access technology;
    transmitting a second probe addressed to the server from the communications device via a second radio access technology that is different from the first radio access technology;
    receiving, by the communications device, a first probe reply from the server via the first radio access technology;
    receiving, by the communications device, a second probe reply from the server via the second radio access technology; and
    determining, by the communications device, whether an access point is a rogue access point based on a result of comparing the first probe reply received from the server via the first radio access technology to the second probe reply received from the server via the second radio access technology.

2. The method of claim 1, further comprising taking an action in response to determining that the access point is a rogue access point based on the result of comparing the first probe reply received from the server via the first radio access technology to the second probe reply received from the server via the second radio access technology.

3. The method of claim 2, wherein taking the action comprises terminating a network connection with at least one of:
    an access point of a first network; or
    an access point of a second network.

4. The method of claim 1, wherein determining whether the access point is a rogue access point based on the result of comparing the first probe reply received from the server via the first radio access technology to the second probe reply received from the server via the second radio access technology further comprises:
    determining whether either the first probe reply or the second probe reply is malicious; and
    determining that the access point is a rogue access point in response to determining that either the first probe reply or the second probe reply is malicious.

5. The method of claim 1, wherein determining whether the access point is a rogue access point based on the result of comparing the first probe reply received from the server via the first radio access technology to the second probe reply received from the server via the second radio access technology further comprises comparing connection results and connection parameters of the first probe reply to connection results and connection parameters of the second probe reply.

6. The method of claim 5, wherein the connection results indicate whether a secure connection was established between the communications device and the server.

7. The method of claim 5, wherein the connection parameters include characteristics of a security certificate.

8. The method of claim 5, wherein the connection parameters include a security level of any redirect uniform resource locators (URLs).

9. The method of claim 5, wherein the connection parameters include characteristics of domain name system queries and results.

10. A communications device, comprising:
    a first transceiver configured to communicate with a first network via a first network connection;
    a second transceiver configured to communicate with a second network via a second network connection;
    a processor coupled to the first and second transceivers and configured with processor executable instructions to perform operations comprising:
        transmitting a first probe addressed to a server from the communications device via a first radio access technology;
        transmitting a second probe addressed to the server from the communications device via a second radio access technology that is different from the first radio access technology;
        receiving a first probe reply from the server via the first radio access technology;
        receiving a second probe reply from the server via the second radio access technology; and
        determining based whether an access point is a rogue access point based on a result of comparing the first probe reply received from the server via the first radio access technology to the second probe reply received from the server via the second radio access technology.

11. The communications device of claim 10, wherein the processor is further configured with processor executable instructions to perform operations further comprising taking an action in response to determining that the access point is a rogue access point based on the result of comparing the first probe reply received from the server via the first radio access technology to the second probe reply received from the server via the second radio access technology.

12. The communications device of claim 11, wherein the processor is further configured with processor executable instructions to perform operations such that taking the action comprises terminating a network connection with at least one of:
    an access point of the first network; or
    an access point of the second network.

13. The communications device of claim 10, wherein the processor is further configured with processor executable instructions to perform operations such that determining whether the access point is a rogue access point based on the result of comparing the first probe reply received from the server via the first radio access technology to the second probe reply received from the server via the second radio access technology further comprises:
- determining whether either the first probe reply or the second probe reply is malicious; and
- determining that the access point is a rogue access point in response to determining that either the first probe reply or the second probe reply is malicious.

14. The communications device of claim 10, wherein the processor is further configured with processor executable instructions to perform operations such that determining whether the access point is a rogue access point based on the result of comparing the first probe reply received from the server via the first radio access technology to the second probe reply received from the server via the second radio access technology further comprises comparing connection results and connection parameters of the first probe reply to connection results and connection parameters of the second probe reply.

15. The communications device of claim 14, wherein the connection results indicate whether a secure connection was established between the communications device and the server.

16. The communications device of claim 14, wherein the connection parameters include characteristics of a security certificate.

17. The communications device of claim 14, wherein the connection parameters include a security level of any redirect uniform resource locators (URLs).

18. The communications device of claim 14, wherein the connection parameters include characteristics of domain name system queries and results.

19. A communications device, comprising:
- means for transmitting a first probe addressed to a server from the communications device via a first radio access technology;
- means for transmitting a second probe addressed to the server from the communications device via a second radio access technology that is different from the first radio access technology;
- means for receiving a first probe reply from the server via the first radio access technology;
- means for receiving a second probe reply from the server via the second radio access technology; and
- means for determining whether an access point is a rogue access point based on a result of comparing the first probe reply received from the server via the first radio access technology to the second probe reply received from the server via the second radio access technology.

20. The communications device of claim 19, further comprising means for taking an action in response to determining that the access point is a rogue access point based on the result of comparing the first probe reply received from the server via the first radio access technology to the second probe reply received from the server via the second radio access technology.

21. The communications device of claim 20, wherein means for taking the action comprises means for terminating a network connection with at least one of:
- an access point of a first network; or
- an access point of a second network.

22. The communications device of claim 19, wherein means for determining whether the access point is a rogue access point based on the result of comparing the first probe reply received from the server via the first radio access technology to the second probe reply received from the server via the second radio access technology further comprises:
- means for determining whether either the first probe reply or the second probe reply is malicious; and
- means for determining that the access point is a rogue access point in response to determining that either the first probe reply or the second probe reply is malicious.

23. The communications device of claim 19, wherein means for determining whether the access point is a rogue access point comprises based on the result of comparing the first probe reply received from the server via the first radio access technology to the second probe reply received from the server via the second radio access technology further comparing connection results and connection parameters of the first probe reply to connection results and connection parameters of the second probe reply.

24. A non-transitory processor-readable medium having stored thereon executable instructions causing a processor of a communications device to perform operations comprising:
- transmitting a first probe addressed to a server from the communications device via a first radio access technology;
- transmitting a second probe addressed to the server from the communications device via a second radio access technology that is different from the first radio access technology;
- receiving a first probe reply from the server via the first radio access technology;
- receiving a second probe reply from the server via the second radio access technology; and
- determining whether an access point is a rogue access point based on a result of comparing the first probe reply received from the server via the first radio access technology to the second probe reply received from the server via the second radio access technology.

25. The non-transitory processor-readable medium of claim 24, wherein the stored processor-executable instructions are configured to cause the processor of the communications device to perform operations further comprising taking an action in response to determining that the access point is a rogue access point based on the result of comparing the first probe reply received from the server via the first radio access technology to the second probe reply received from the server via the second radio access technology.

26. The non-transitory processor-readable medium of claim 25, wherein the stored processor-executable instructions are configured to cause the processor of the communications device to perform operations such that taking the action comprises terminating a network connection with at least one of:
- an access point of a first network; or
- an access point of a second network.

27. The non-transitory processor-readable medium of claim 24, wherein the stored processor-executable instructions are configured to cause the processor of the communications device to perform operations such that determining whether the access point is a rogue access point based on the result of comparing the first probe reply received from the server via the first radio access technology to the second probe reply received from the server via the second radio access technology comprises:

determining whether either the first probe reply or the second probe reply is malicious; and determining that the access point is a rogue access point in response to determining that either the first probe reply or the second probe reply is malicious.

28. The non-transitory processor-readable medium of claim 24, wherein the stored processor-executable instructions are configured to cause the processor of the communications device to perform operations such that determining whether the access point is a rogue access point based on the result of comparing the first probe reply received from the server via the first radio access technology to the second probe reply received from the server via the second radio access technology comprises comparing connection results and connection parameters of the first probe reply to connection results and connection parameters of the second probe reply.

* * * * *